(12) United States Patent
Bolden

(10) Patent No.: US 8,980,182 B2
(45) Date of Patent: Mar. 17, 2015

(54) REACTOR CONTROL

(75) Inventor: Roger Bolden, Noble Park (AU)

(73) Assignee: BK Giulini GmbH, Ludwigshafen (DE)

( * ) Notice: Subject to any disclaimer, the term of this patent is extended or adjusted under 35 U.S.C. 154(b) by 314 days.

(21) Appl. No.: 12/995,896

(22) PCT Filed: Jun. 4, 2009

(86) PCT No.: PCT/AU2009/000709
§ 371 (c)(1),
(2), (4) Date: Feb. 7, 2011

(87) PCT Pub. No.: WO2009/146501
PCT Pub. Date: Dec. 10, 2009

(65) Prior Publication Data
US 2011/0118103 A1    May 19, 2011

(30) Foreign Application Priority Data
Jun. 4, 2008 (AU) ................................. 2008902847

(51) Int. Cl.
    *B01J 19/20*      (2006.01)
    *B01J 4/00*      (2006.01)
    *B01F 7/24*      (2006.01)
(Continued)

(52) U.S. Cl.
CPC ... *B01J 19/28* (2013.01); *B01J 4/02* (2013.01); *B01J 4/008* (2013.01); *B01J 2219/00164* (2013.01); *B01J 4/00* (2013.01); *B01F 7/00816* (2013.01); *B01F 7/246* (2013.01); *B01J 19/1887* (2013.01); *B01J 19/20* (2013.01); *B01J 2219/00162* (2013.01); *B29C 47/0009* (2013.01); *B29C 47/1081* (2013.01); *B29C 47/38* (2013.01); *B29C 47/1063* (2013.01); *B29C 47/525* (2013.01)

USPC ........ 422/129; 422/225; 422/229; 366/162.1; 366/318

(58) Field of Classification Search
None
See application file for complete search history.

(56) References Cited

U.S. PATENT DOCUMENTS 4,170,319 A * 10/1979 Suh et al. ...................... 222/134
4,381,272 A     4/1983 Ehritt
(Continued)

FOREIGN PATENT DOCUMENTS

DE    10 2005 049926 A1    9/2007
EP        0 409 079 A2    1/1991
(Continued)

OTHER PUBLICATIONS

Machine translation for FR 2299077 A (Oct. 1976).*
(Continued)

*Primary Examiner* — Jennifer A Leung
(74) *Attorney, Agent, or Firm* — Melissa M. Hayworth; E. Joseph Gess

(57) ABSTRACT

A liquid phase reactor comprising a screw within a barrel, the screw and barrel being relatively rotatable and defining a mixing zone therebetween, the barrel having at least two inlets for introduction of components for mixing into the barrel and an outlet for discharge of a product of mixing from the barrel, the screw comprising a spiral groove whereby relative rotation of the screw and barrel is adapted to axially transport the components between the screw and barrel while mixing the components and to extrude the product through the outlet, wherein the reactor is adapted to achieve a substantially constant flow ratio of components into the barrel during operation of the reactor.

25 Claims, 4 Drawing Sheets

(51) Int. Cl.
*B01F 7/28* (2006.01)
*B01J 19/28* (2006.01)
*B01F 7/00* (2006.01)
*B01J 19/18* (2006.01)
*B29C 47/10* (2006.01)
*B29C 47/38* (2006.01)
*B29C 47/52* (2006.01)
*B01J 4/02* (2006.01)
*B29C 47/00* (2006.01)

(56) References Cited

U.S. PATENT DOCUMENTS

| | | | | |
|---|---|---|---|---|
| 4,400,236 | A | * 8/1983 | Hanamura et al. | 159/2.2 |
| 4,964,732 | A | * 10/1990 | Cadeo et al. | 366/152.1 |
| 2004/0089973 | A1 | 5/2004 | Hoang | |
| 2005/0009936 | A1 | 1/2005 | Xu | |

FOREIGN PATENT DOCUMENTS

| | | | |
|---|---|---|---|
| FR | 2 299 077 | A1 | 8/1976 |
| FR | 2299077 | A * | 10/1976 |
| FR | 2486820 | A * | 1/1982 |
| GB | 1139212 | A | 1/1969 |
| JP | 2000-015069 | A | 1/2000 |
| JP | 2004-531375 | A | 10/2004 |
| TW | 527271 | B | 4/2003 |
| WO | 00/59702 | A1 | 10/2000 |
| WO | 02/76609 | A1 | 10/2002 |

OTHER PUBLICATIONS

Machine translation for FR 2486820 A (Jan. 1982).*
Machine translation and abstract for JP 2000-015069 A (Jan. 2000).*
International Search Report from PCT/AU2009/000709 dated Aug. 19, 2009, 2 pages.
European Search Report from EP 09 75 6966 dated Nov. 23, 2011, 3 pages.
Chinese First Office Action dated Jan. 6, 2013 issued in the corresponding Chinese application No. 200980130518.4, English and Chinese translations, 15 pages.
Japanese Official Action Summary dated Apr. 16, 2013 issued in the corresponding Japanese application No. 2011-511939, 1 page.

* cited by examiner

REACTOR CONTROL

This application is a National Stage Application of PCT/AU2009/000709, filed 4 Jun. 2009, which claims benefit of Application No. 2008902847, filed 4 Jun. 2008 in Australia, which applications are incorporated herein by reference. To the extent appropriate, a claim of priority is made to each of the above disclosed applications.

This present invention relates to a liquid phase reactor. More specifically, the invention relates to a continuous flow reactor for liquid phase processing that is adapted to produce products having very uniform and repeatable composition. The present invention also relates to a process for conducting liquid phase reactions in such a reactor and to products formed by this process.

Applicant's own International patent publication WO 02/076609 (and other reactors in the art of generally similar design) describes a liquid phase reactor comprising a screw within a barrel provided in a vertical orientation. The screw and barrel are rotatable relative to each other. In the embodiment that is illustrated in the figure in the specification the barrel includes a plurality of inlets for introduction of individual components, such as reactants, into the barrel. The screw has at least one spiral groove and relative rotation of the screw and barrel cause axial transport of the components between the screw and barrel, thereby facilitating mixing of the components. During operation the components are pumped through respective inlets.

Use of the reactor taught in Applicant's WO publication has been found to give acceptable results in terms of product homogeneity and production rate. However, for reasons that are explained below, there is scope for improvement, especially with respect to the homogeneity of the product output of the reactor.

Where mixing (and possible reaction) of multiple components is required individual components are delivered into the barrel through respective inlets. The flow rates of the individual components into the barrel will determine the relative ratio of the components for mixing. Where the compounds are reactive towards each other, the flow rates will influence the reactants stoichiometry. It has been found however that the flow rate of a component through a barrel inlet will be influenced by the back-pressure exerted at the inlet due to the environment presented by the screw at the inlet.

In simple terms and noting that the screw includes a spiral groove, as the screw/barrel rotate relative to one another, the inlet will feed into the groove of the screw when the groove is adjacent the inlet and onto the lands of the screw when the lands are adjacent the inlet. Of course, there are situations between these two possibilities as the screw/barrel rotate. The effect of this is that the back-pressure exerted at the inlet will vary over a 360° rotation of the screw relative to the barrel. In turn this variation in back-pressure can cause a variation in flow rate of the relevant component into the barrel (assuming that the rate of pumping of the component is constant). Now this effect will occur for each component inlet with the result being that the flow rate of components into the barrel will not remain constant. This will then impact on the uniformity of the product produced, be that a physical mixture or reaction product.

The variation in flow rate of individual components and the resultant impact on product characteristics can be tolerated in certain circumstances. However, this effect prevents products having a very high degree of homogeneity being produced. In certain applications, for example, in the preparation of slurries intended for production of electrolyte layers, variations in product composition can lead to unfavourable variations in characteristics in the electrolyte to be produced.

Against this background it would be desirable to provide a liquid phase reactor that does not suffer the drawbacks that have been described.

Accordingly, in one embodiment the present invention provides a liquid phase reactor comprising a screw within a barrel, the screw and barrel being relatively rotatable and defining a mixing zone therebetween, the barrel having at least two inlets for introduction of components for mixing into the barrel and an outlet for discharge of a product of mixing from the barrel, the screw comprising a spiral groove whereby relative rotation of the screw and barrel is adapted to axially transport the components between the screw and barrel while mixing the components and to extrude the product through the outlet, wherein the reactor is adapted to achieve a substantially constant flow ratio of components into the barrel during operation of the reactor.

In accordance with the present invention the reactor is specifically designed and/or operated so that the effect of back-pressure at the inlets to the barrel during component feed and rotation of the screw are minimized, and preferably completely negated, so that a constant flow ratio of components into the barrel can be achieved. This enables: mixing of components at a constant ratio with the result being increased and high product homogeneity; products to be produced with repeatable results as between process runs of the reactor; and greater control over product characteristics.

The invention resides in the appreciation that variations in back-pressure at component inlets during relative rotation of the screw and barrel can lead to detrimental variations in component flow rate into the barrel of the reactor, and in general terms the invention involves one or more specific design/operational aspects that are intended to mitigate, and preferably avoid altogether, the effect of such back-pressure. It is believed that this is the first recognition of the back-pressure problem in so far as it impacts on product homogeneity and thus the first attempt to solve that problem.

The present invention also provides a process for mixing or homogenizing components using a reactor in accordance with the present invention, which comprises introducing components into the barrel through respective inlets, relatively rotating the screw and barrel to effect mixing and/or homogenizing while axially transporting components between the screw and barrel and discharging product through the outlet.

The invention further provides a product formed by mixing and/or homogenizing components by implementation of the process of the invention, i.e. using the reactor of the present invention.

DISCUSSION OF FIGURES

Embodiments of the present invention are illustrated with reference to the accompanying drawings in which.

Figure 1:
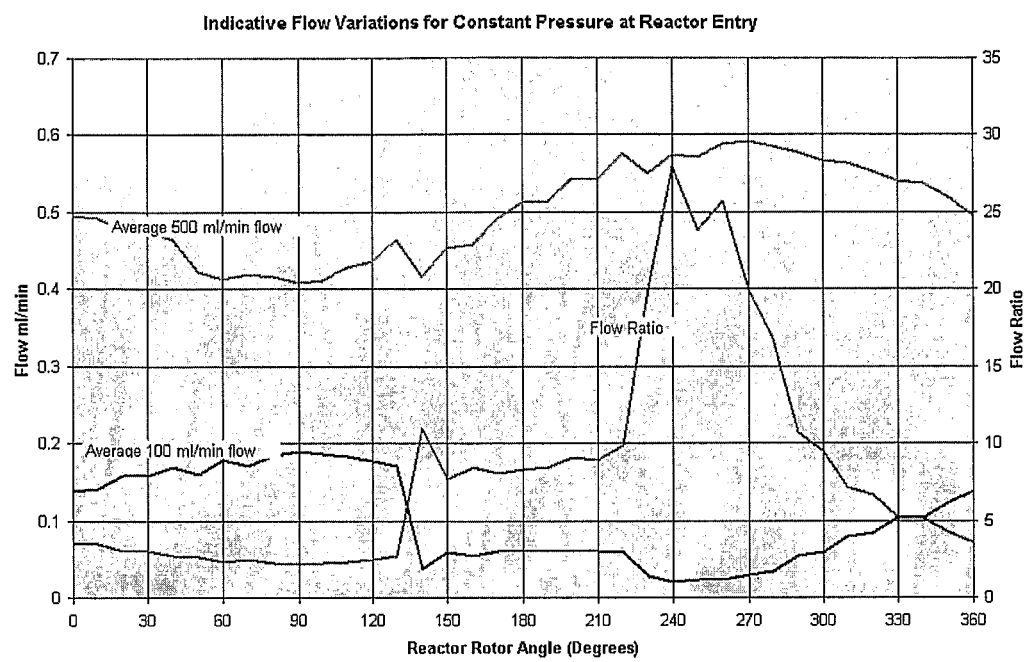
FIG. 1 is a graph showing flow variations for constant pressure at inlet entry for a conventional liquid phase reactor comprising two inlets.

FIG. 1 conveniently represents the problematic effect of back-pressure on flow ratio of components into a barrel of a liquid phase reactor as the screw and barrel rotate relative to each other. The components are delivered through respective inlets at constant pressure. The average flow rate of the components is 100 ml/min and 500 ml/min respectively but, as the graph illustrates, the actual flow rate at any point in time varies with relative rotation of the screw and barrel (denoted in degrees as "Reactor Rotor Angle"). This is because as the screw/barrel rotate the back-pressure exerted at respective inlets varies due to the environment presented at the inlets by the screw. This variation in back-pressure causes the actual flow rate of the components to fluctuate. In turn this variation in actual flow rate causes significant fluctuation in flow ratio of the components. For the average flow rates given, this ratio should preferably remain at or close to a value of 5:1 (i.e. 500/100). A result of variation in the flow ratio is that the product characteristics will also vary based on the ratio of components available for mixing at any instant in time. Ideally, the product characteristics should remain uniform.

Figure 4:
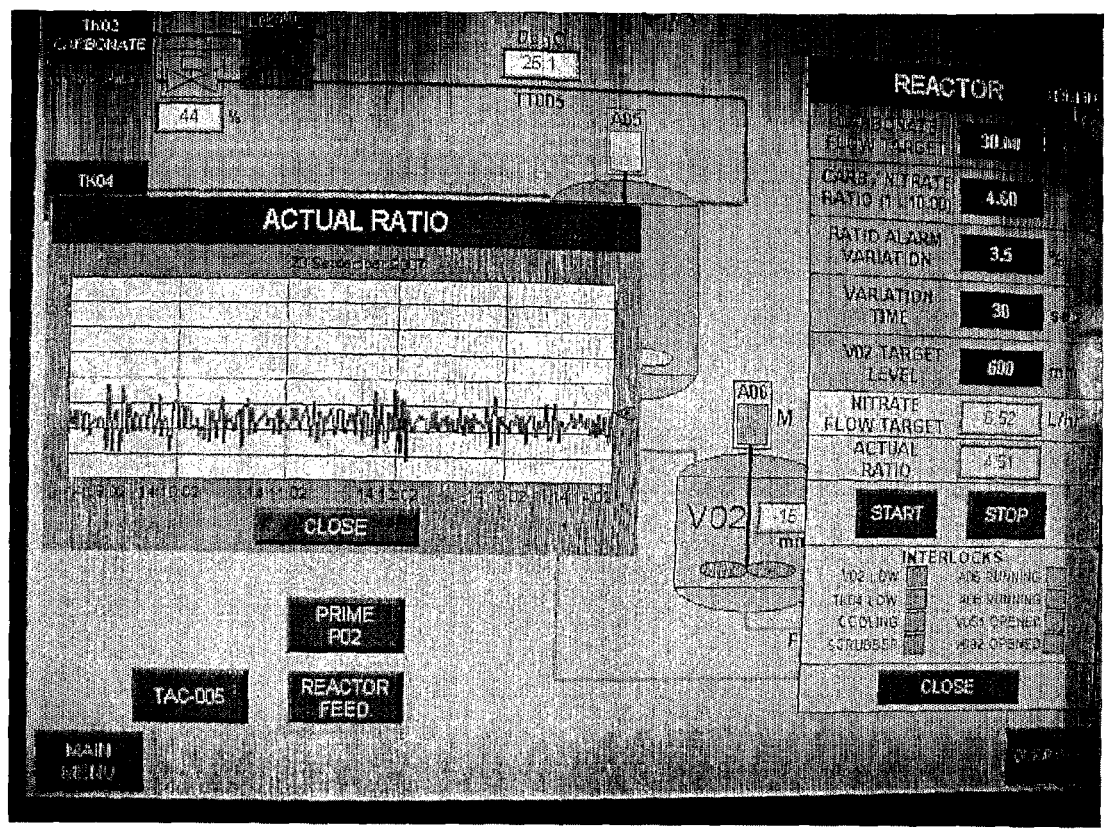
FIGS. 4 and 5 are photographs of a flow control display screen showing respectively variations in reactant flows (as ratio of zirconium to yttrium reactant flow) before (FIG. 4) and (after FIG. 5) implementing back pressure compensation.
Figure 5:
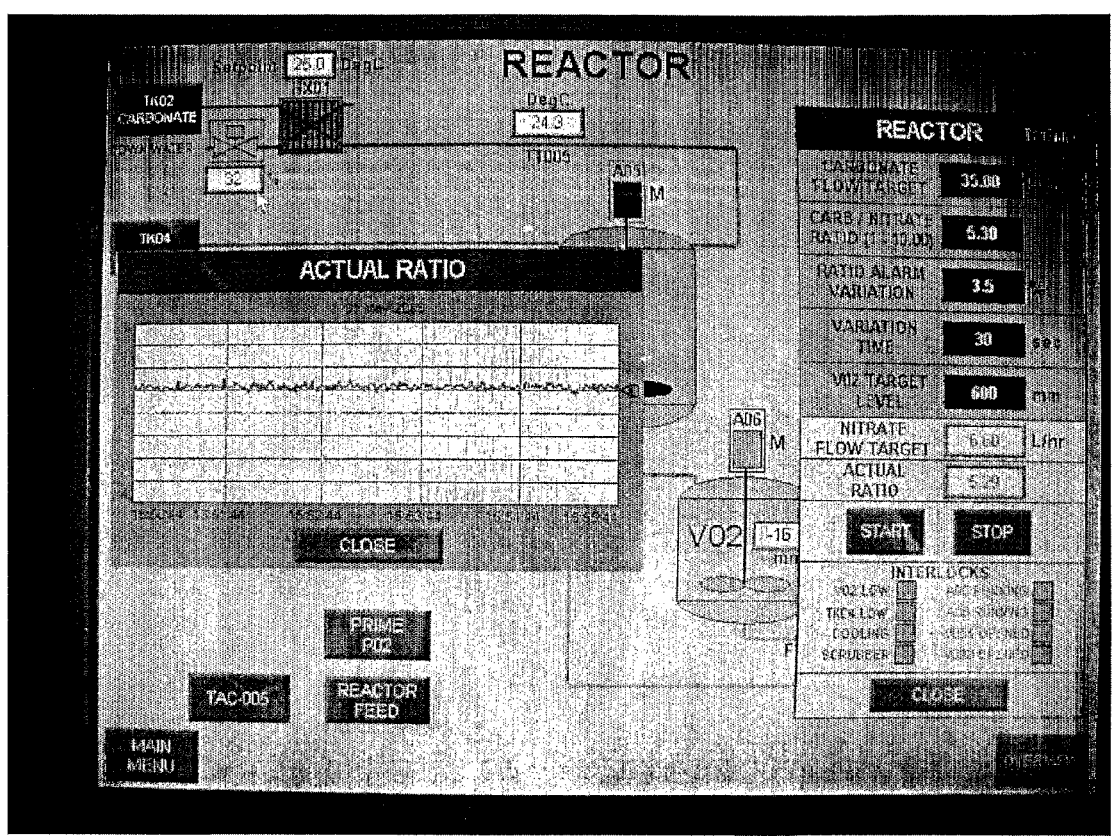

A flow model was used to calculate the pressure variation as a function of rotor angle and these pressure variations were converted to flow fluctuations using overall flows of 100 cc/min and 500 cc/min respectively. These variations are visible on the flow display screen on the control panel of the plant (see FIGS. 4 and 5). In FIG. 4 the actual ratio of reactant feed varies much more significantly than in FIG. 5.

Figure 2:
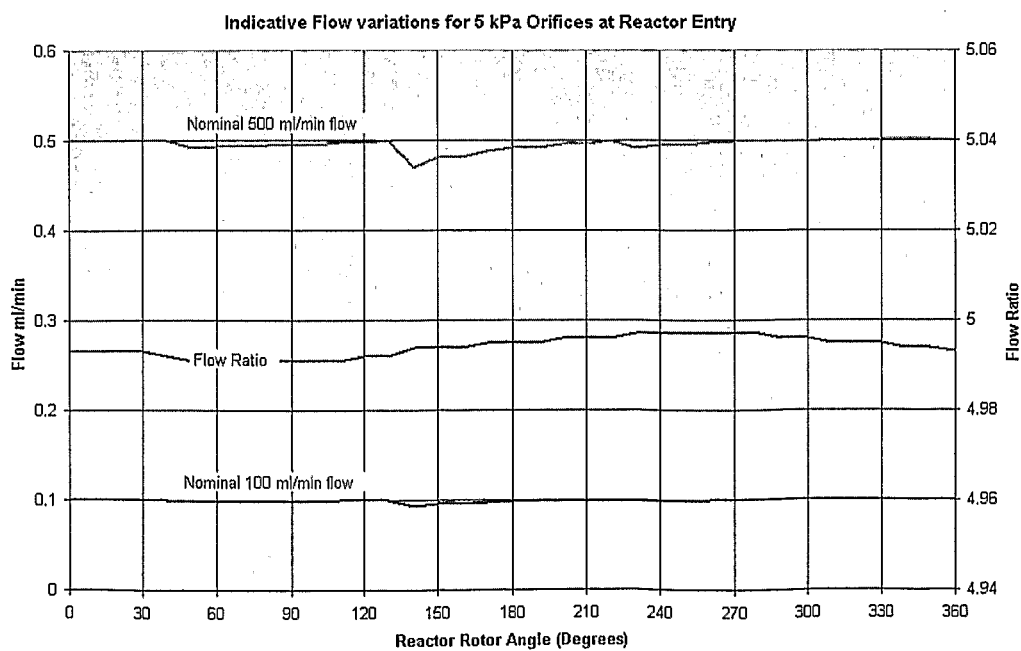
FIG. 2 is a graph showing flow variations at inlet entry for a reactor in accordance with the present invention.

FIGS. 1 and 2 were derived from Finite Element (FEM) Model calculations, carried out to estimate the variations in reagent flow to the mixer. This involved modelling the mixing volume as many small elements (defining mesh according to geometry of reactor), and solving this model for the flow of the reagents, which were represented as viscous fluids. The model included the spiral groove in the rotor, the orifice geometry, location and size, and the fluid viscosity was varied with position to represent the changes due to the chemical reactions within the mixer (groove and land area).

It was found that the reagent flows were very sensitive to the rotor angular position (due to backpressure), leading to fluctuations in reagent delivery as the mixer rotated. The large variation in the ratio between yttrium and zirconium chemical flow will lead to variations in the composition of the final powder product. The inclusion of flow constrictions to counteract the created varying backpressure in the reagent delivery paths was also modelled, with the aim to identify a robust operating regime with minimum flow variations.

In an embodiment of the present invention the inlet orifice for delivery of a component into the barrel is designed to give a predetermined "overpressure" in order to desensitize component delivery from any fluctuations in back-pressure during reactor operation.

The basis of this embodiment involves designing an inlet to the barrel so that under the proposed operating conditions, including flow rate and component density and viscosity, a pressure drop will occur across the outlet (orifice) of the inlet. This "over pressure" is intended to mitigate, and preferably negate completely, the effect of back-pressure as the screw and barrel rotate relative to one another. In this case the "over pressure" is typically equal to and preferably in excess of the maximum back-pressure that will be observed during operation of the reactor. The back-pressure can be calculated (see FEM calculation described above) using orifice size and geometry. It is difficult to measure values of pressure variation due to the high frequency of change (speed of rotation of cylinder), but the amplitude of "noise" on the flow meter display (showing the ratio yttrium to zirconium chemical flow measured by flow meters in each stream) allows a qualitative assessment (see FIGS. 4 and 5).

One skilled in the art may determine and manipulate as necessary the pressure drop associated with a given inlet and component profile.

By way of example for an assumed product density of 1.1 g/cc and a viscosity of reactants of 10 CPs for carbonate (@19.8° C.) and 5 CPs for nitrate (@14.4° C.) (Brookfeed viscosity, spindle #1). The flow model predicts that a square edged (circular) orifice will give a pressure drop of 5 kPa at a diameter of 1.03 mm for a flow rate 100 ml/minute and a diameter of 2.31 mm for a flow rate of 500 mL/minute. These calculations also assume that the components of mixing form a slurry at a viscosity of 200 poise (at 23° C.).

Precise orifice sizes may not be essential as mass flow controllers may control the average flows. Thus:

A 1 mm orifice in the 100 mL/minute stream would give an "over pressure" of about 6.4 kPa.

A 2.5 mm orifice in the 500 ml/minute stream would give a "over pressure" of about 4.3 kPa.

A 2.38 mm (3/32 inch) orifice in the 500 ml/minute stream would give a "over pressure" of about 3.6 kPa (which is a bit too low).

In this embodiment of the invention it may not be necessary to achieve a precise "over pressure" across respective inlets provided that the magnitude of the pressure drop is sufficient to mitigate and preferably negate the effects of back-pressure at the respective inlets.

FIG. 2 illustrates the improvement in flow ratio control that can be achieved in accordance with this embodiment of the invention. The rotation speed appears to have little influence, whereas inlet position does as the pressure variation is created by the movement of grooves and lands in front of the reactor inlet orifice ("shutter effect") "over pressure".

The principle of compensation for back pressure (due to pressure drop variations) applies generally to other operating parameters, including geometry and size of grooves and lands and viscosity of the incoming liquids and the outgoing product.

As can be seen in FIG. 2 the variation in instantaneous flow rate varies to much less of an extent for FIG. 1 with the result that the flow ratio remains essentially constant (about 5:1).

In this embodiment it is found that delivery pressures upstream of the inlet orifices fluctuates significantly, accumulators may be introduced to maintain constant delivery pressure.

As an alternative to this embodiment (inlet orifice control), a needle valve or the like may be used to compensate for the requisite back pressure. The needle valve, or like, will be associated with a component delivery line and inlet. The intention here is to avoid fluctuations in back-pressure so that a constant flow of component into the barrel may be achieved.

In another embodiment of the invention the flow rate of respective components may be varied in order to overcome back pressure effects. In this embodiment the instantaneous flow rate will vary as a function of the back pressure in order to maintain as far as possible a constant flow rate of component into the barrel. In this embodiment mass flow controllers may be used to regulate the flow rates to target levels in order to achieve the desired outcome of the negating back pressure effects. One possible limitation of this embodiment however is that the mass flow regulator must have the ability to vary component flow with variations in back pressure. This may prove difficult at high relative rotation speeds of screw and barrel. At high relative rotation speeds the mass flow regulator will need to be highly responsive to variations in back pressure.

In another embodiment of the invention the reactor is adapted to minimize, and preferably avoid, variations in back pressure as the screw and barrel rotate relative to one another. This could be done by the use of a flow-through back pressure regulator associated with a component delivery line. The intention here is to avoid fluctuations in back pressure so that constant flow of components may be achieved.

In another embodiment the back-pressure exerted at a component inlet, or rather variations in that back-pressure, may be minimized or avoided altogether, by appropriate screw design and positioning of the inlet relative to the screw. Thus, if the environment presented to an inlet is essentially constant as the screw and barrel rotate relative to each other, the back-pressure exerted should be essentially constant (under steady state operating conditions).

By way of example, in this embodiment a component inlet may feed a component onto the lands of the screw over a full 360° rotation of the screw. In other words the inlet does not at any point feed component into a groove or groove portion of the screw. This arrangement may be achieved by suitable design of the screw grooves and lands. In this embodiment the design of the screw with respect to groove pitch may vary along the axial length of the screw.

By way of further example, the inlet may be positioned adjacent a circumferential groove (i.e. of zero pitch) and feed component into this groove. As the screw rotates the environment presented at the inlet viz-à-viz this groove will be essentially constant and this back-pressure that is exerted will also be essentially constant. In this case a spiral groove may be provided on the screw with the spiral groove receiving component from the circumferential groove by a feeder groove extending between the two. The environment presented at the inlet by the meeting of the feeder groove and circumferential groove will represent a point of diversity relative to the environment presented at the inlet by the remainder of the circumferential groove. This will cause a fluctuation in back-pressure but this will be significantly less in effect than would be experience with conventional spiral grooves.

The embodiments described herein may be applied individually or in combination. Usually, one or more embodiments are applied to each component inlet associated with the reactor of the invention.

With respect to the characteristics of the screw used in the reactor of the invention the land surface area between the spiral groove generally forms at least 50% of the surface area of the screw in the mixing zone. Preferably, and taking into account component characteristics, the turbulence imparted to the components during the mixing is at least about 25,000 Reynolds number (R), preferably from 25,000 to 100,000 R.

The liquid phase reactor of the present invention is particularly suited for processing multi-phase liquids, but may be used for slurry mixing and/or homogenization, advantageously at rotational speeds sufficient to achieve high turbulence in the components in the reactor.

In an embodiment, the reactor of the present invention may also be used for conducting liquid phase reactions whereby the components introduced into and mixed in the reactor chemically react. Thus, further according to the present invention there is provided a process for performing liquid phase reactions in a reactor in accordance with the invention which comprises introducing the components to a reaction to the mixing zone through two or more inlets, relatively rotating the screw and the barrel to mix the components, causing the mixed components to react to produce a product, and discharging the product through the outlet.

In an embodiment the outlet of the reactor of the present invention is connected or connectable to the inlet or to one of the inlets for recycling product.

In another embodiment the surface area defined on the wall of the barrel by the spiral groove is substantially smaller than the overall surface area defined on the wall of the barrel in the mixing zone by the screw.

The volume of the mixing zone of the reactor is the sum of the annular volumetric clearance between the lands of the screw and the wall of the barrel (the clearance volume) and the volume of the spiral groove (the groove volume). Normally, the mixing zone will be considered to extend axially between the at least one inlet and the discharge outlet. Preferably, the groove volume will be as small as possible while still effective to transport the mixing/reaction components and/or product through the mixing zone. However, because of the preferred small depth of the clearance volume, the groove volume is likely to comprise at least 50% of the volume of the mixing zone. The maximum ratio of the groove volume to the clearance volume is preferably about 5:1, more preferably about 3:1.

Preferably the volume of the groove is substantially smaller than the overall volume of the screw, for example in the range 1:10 to 1:50. In a laboratory scale embodiment of the reactor, the reactor screw may have a radius of about 15 mm, the spiral groove may have a depth of about 1-3 mm, the clearance volume may have a depth of about 0.01 to 3 mm, preferably 0.05 to 0.5 mm, and the overall mixing zone may have a volume in the range of about 0.5 to 10 cm$^3$. As a result of the relatively small groove volume and the narrow clearance volume, the reactor is able to continuously produce high quality and uniform slurry product. A grinding action of solids in the components or product in the clearance volume greatly assists in achieving a uniform product.

It will be understood that the effective volume, depth, pitch, and length of the spiral groove(s) and the geometry of the screw in general determine process parameters such as residence time and turbulence which influence the product quality and production rate. These aspects of the reactor may need to be optimised and adapted to the critical parameters of the mixing performed in the reactor.

Advantageously, the discharge outlet opens to the barrel interior on the axis of the barrel, and preferably the clearance volume is rounded, for example part-spherical, between cylindrical portions of the screw and barrel wall and the discharge outlet.

The reactor can be operated in a vertical position, horizontal position or on an incline. Preferably the reactor is operated in the vertical position with the discharge outlet at the lowermost end, as gravitational forces beneficially influence sealing and mass transport. The screw may rotate at from about 100 to about 10,000 rpm, preferably from 500 to 2,000 rpm, to achieve the desired turbulent mixing. The preferred rotational speed is less than that required in large batch reactors (typically more than 2,000 rpm) to achieve a similar degree of high turbulent mixing. This helps to reduce the fixed operating costs of the reactor of the present invention.

The effective transportation volume or mixing zone of the present reactor can be significantly less than that of batch reactors, leading to substantial advantage when relatively small quantities of product are required. Typically, the production rate (product throughput) using reactor of the present invention is from 0.25 to 0.75 kg/h, preferably about 0.5 kg/h. Mixing may be performed at ambient or elevated temperatures.

In the reaction process, the individual components for reaction may be introduced into the barrel through respective inlets. Solvents, catalysts, moderators and/or carriers may be added to control or aid the mixing and reaction.

The residence time in the reactor is usually less than in a conventional batch reactor, requiring the rate of reaction to be rapid. However where incomplete or insufficient reaction has been achieved, the product obtained may be fed back into the reactor for a second or subsequent pass. The required recycle rate is largely determined by the reaction rate.

The temperature at which the components are reacted in the reactor may be from ambient up to 500 EC or more depending on the components, their concentrations and other factors. Heating may be achieved by reaction, by heating one or more of the reaction components and/or by heating the barrel and/or screw. Optionally, cooling of the reactor may be provided.

The reactor of the present invention can produce a slurry product, including a slurry precursor of a solid product. The product obtained may be a precipitate, co-precipitate or sol-gel, more preferably a precursor powder of uniform consistency and high quality. The product can be inorganic, organic or a mixture thereof.

In a preferred embodiment, the reactor of the present invention is used for, powder precipitation. Typical reactions that may be performed in the reactor are precipitations and co-precipitations. These and other reactions can produce precursor solid products such as insoluble inorganic precursors of simple oxides, multi-component oxides, mixed oxides, or mixtures thereof having homogeneity and high dispersion. Such reaction products can lead to uniform, highly dispersed and high reactivity powders for further processing (eg. sintering to ceramic parts).

Embodiments of the present invention will now be described by way of example only with reference to the following Examples and the accompanying drawing. The Examples and drawing are not to be construed as limiting the invention in any way.

The drawing is a part-sectional representation of a laboratory-scale annular reactor. The drawing illustrates reactor 10 having a screw 12 rotatably supported in a barrel or cylinder 14. The axis of rotation of screw 12 is vertical. The screw has a rounded, part-spherical bottom end 34, and the cylinder 14 has a plugged, correspondingly-shaped bottom end 16 with an outlet 18 on the axis of rotation, and a closed top end 38. Components for reaction are fed into the reactor 10 through inlets 20 and 22, and recycled material from the discharge outlet 18 may be introduced through inlet 36. The inlets 20 and 22 are opposite one another part-way down the axial length of the cylinder and the inlet 36 for recycled material is disposed between the top 24 of the screw 12 and the inlets 20 and 22.

Figure 3:
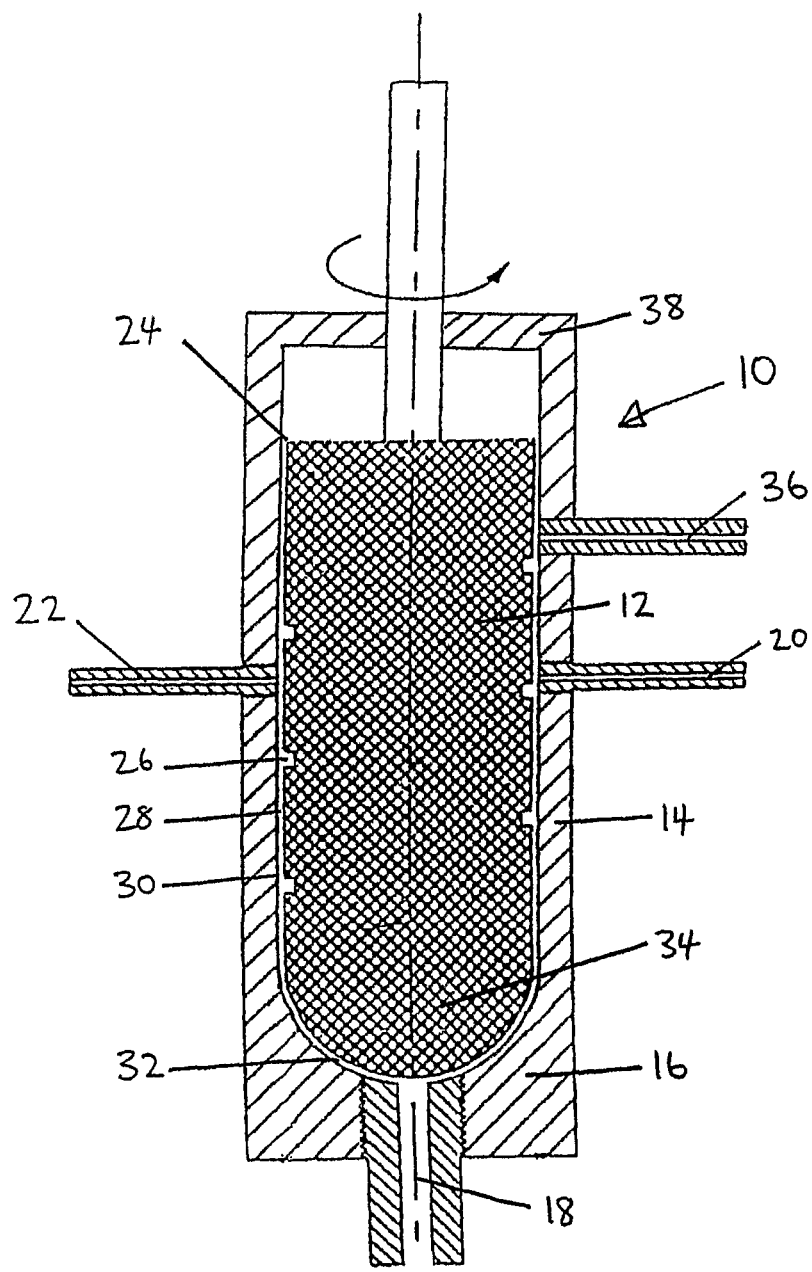
FIG. 3 is a part-sectional representation of a laboratory-scale annular reactor.

A cylindrical portion of the screw is provided with a surface spiral groove 26 for axially transporting and turbulently mixing the components as the screw is rotated. A clearance volume 28 and 32 between the screw 12 and the cylinder 14 combines with the groove volume to define a mixing zone, with grinding of solids in the clearance volume greatly assisting the formation of homogenous product. In the illustrated reactor 10, the clearance volume has a depth of about 0.1 mm. The volume and depth of the groove 26 is substantially less than the volume and radius, respectively, of the screw 12, the groove having a depth of about 2 mm while the screw has a radius of about 15 mm. The surface area defined by the groove 26 on the internal wall 30 of the cylinder 14 is substantially less than the land area between the portions of the groove and forms less than 10% of the overall surface area defined by the screw 12 on the internal wall 30 of the cylinder 14. The ratio of the volume of the groove 26 and the clearance volume 28 is about 2:1. The volume of the reaction zone of the laboratory scale reactor 10 as illustrated is about 1.5 cm³. A production scale reactor may be substantially larger. The reactor generally depicted in FIG. 3 may be adapted to include any one or more embodiments of the invention described herein in order to achieve an essentially constant flow ratio of components as desired.

The invention is especially well suited to the production of yttria-stabilised zirconia powder by reaction of yttrium and zirconium nitrate. In forming the powder the stoichiometry at which the reactants are mixed is critical to the product characteristics. For example, desirably a product of 8 mol % yttria-zirconia is co-precipitated using a reactor of the invention. The product takes the form of a homogeneous slurry that can be filtered and the resultant powder precursor calcined to achieve the product powder. The latter is useful in forming electrolyte layers for use in solid oxide fuel cells.

It may also be desirable in accordance with the present invention to produce a perovskite complosion $La_{0.8} SR_{0.2} MnO_3$ by co-precipitation from a mixed lanthanum-, strontium-, manganese nitrate solution. After filtration, drying and calcination, a homogeneous single phase perovskite may be obtained.

The reactor of the invention may also be used for mixing/homogenising/dilution of slurries such as paints and inks.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A liquid phase reactor comprising a single screw within a barrel, the screw and barrel being relatively rotatable and defining a mixing zone therebetween, the barrel having at least two inlets for introduction of components for mixing into the barrel and an outlet for discharge of a product of mixing from the barrel, the screw comprising a spiral groove whereby relative rotation of the screw and barrel is adapted to axially transport the components between the screw and barrel while mixing the components and to extrude the product through the outlet, wherein the reactor has means for achieving a substantially constant flow ratio of the components into the barrel during operation of the reactor, wherein said means comprises appropriate screw design and positioning of at least one inlet of the at least two inlets relative to the screw to minimize or avoid back-pressure at the at least one inlet of the at least two inlets; wherein the environment presented to the at least one inlet is essentially constant as the screw and barrel rotate relative to each other, so that the back-pressure exerted is essentially constant under steady state operating conditions; wherein the at least one inlet is positioned adjacent a circumferential groove and a feed component is fed into this groove through the at least one inlet; and wherein the spiral groove receives the feed component from the circumferential groove by a feeder groove extending between the two.

2. A reactor according to claim 1, wherein said means for achieving a substantially constant flow ratio comprises the reactor being designed and/or operated so that the effect of back-pressure at at least one inlet of the at least two inlets to the barrel during component feed and rotation of the screw are minimized or completely negated.

3. A reactor as claimed in claim 1, wherein said means for achieving a substantially constant flow ratio comprises at least one inlet of the at least two inlets for delivery introduction of a component into the barrel being designed to give a predetermined "overpressure" in order to desensitize component delivery from any fluctuations in back-pressure during reactor operation.

4. A reactor as claimed in claim 1, wherein said means for achieving a substantially constant flow ratio comprises at least one inlet of the at least two inlets being designed so that under the proposed operating conditions, including flow rate and component density and viscosity, a pressure drop will occur across the outlet of the at least one inlet.

5. A reactor according to claim 4, wherein the pressure drop is equal to or in excess of the maximum back-pressure that will be observed during operation of the reactor.

6. A reactor according to claim 1, wherein said means for achieving a substantially constant flow ratio comprises an accumulator associated with at least one inlet of the at least two inlets to maintain constant delivery pressure of a component to be introduced through the at least one inlet.

7. A reactor according to claim 1, wherein said means for achieving a substantially constant flow ratio comprises a needle valve to avoid fluctuations in back-pressure so that a constant flow of at least one component of the components into the barrel may be achieved.

8. A reactor according to claim 1, wherein said means for achieving a substantially constant flow ratio comprises varying means for varying the flow rate of respective components in order to overcome back-pressure effects.

9. A reactor according to claim 8, wherein the varying means vary flow rate as a function of the back-pressure in order to maintain as far as possible a constant flow rate of respective components into the barrel.

10. A reactor according to claim 9, wherein mass flow controllers are used to regulate the flow rates to target levels in order to achieve the desired outcome of negating back-pressure effects.

11. A reactor according to claim 1, said means for achieving a substantially constant flow ratio comprises a flow-through back-pressure regulator associated with a component delivery line to at least one inlet of the at least two inlets of the reactor to avoid fluctuations in back-pressure so that constant flow of the components may be achieved.

12. A reactor according to claim 1, wherein the at least one inlet feeds a component onto the lands of the screw over a full 360° rotation of the screw.

13. A liquid phase reactor comprising a single screw within a barrel, the screw and barrel being relatively rotatable and defining a mixing zone therebetween, the barrel having at least two inlets for introduction of components for mixing into the barrel and an outlet for discharge of a product of mixing from the barrel, the screw comprising a spiral groove whereby relative rotation of the screw and barrel is adapted to axially transport the components between the screw and barrel while mixing the components and to extrude the product through the outlet, wherein the reactor is adapted to achieve a substantially constant flow ratio of components into the barrel during operation of the reactor, wherein back-pressure at at least one inlet of the at least two inlets is minimized or avoided by appropriate screw design and positioning of the at least one inlet relative to the screw, wherein the environment presented to the at least one inlet is essentially constant as the screw and barrel rotate relative to each other so that the back-pressure exerted is essentially constant under steady state operating conditions, wherein the at least one inlet is positioned adjacent a circumferential groove and a feed component is fed into this groove through the said at least one inlet; and wherein the spiral groove receives the feed component from the circumferential groove by a feeder groove extending between the two.

14. A liquid phase reactor comprising:
a single screw within a barrel, the screw and barrel being relatively rotatable and defining a mixing zone therebetween, the barrel having at least two inlets for introduction of components for mixing into the barrel and an outlet for discharge of a product of mixing from the barrel, the screw comprising a spiral groove whereby relative rotation of the screw and barrel is adapted to axially transport the components between the screw and barrel while mixing the components and to extrude the product through the outlet, and
a back-pressure mitigating system for achieving a substantially constant flow ratio of the components into the barrel during operation of the reactor, wherein the back-pressure mitigating system comprises appropriate screw design and positioning of at least one inlet of the at least two inlets relative to the screw to minimize or avoid back-pressure at the at least one inlet of the at least two inlets; wherein an environment presented to the at least one inlet is essentially constant as the screw and barrel rotate relative to each other so that the back-pressure exerted is essentially constant under steady state operating conditions; wherein the at least one inlet is positioned adjacent a circumferential groove and a feed component is fed into this groove through the at least one inlet; and wherein the spiral groove receives the feed component from the circumferential groove by a feeder groove extending between the two.

15. A reactor according to claim 14, wherein the back-pressure mitigating system is designed and/or operated so that the effect of back-pressure at at least one inlet of the at least two inlets to the barrel during component feed and rotation of the screw is minimized or completely negated.

16. A reactor as claimed in claim 14, wherein the back-pressure mitigating system comprises at least one inlet of the at least two inlets for introduction of a component into the barrel being designed to give a predetermined "overpressure" to desensitize component delivery from any fluctuations in back-pressure during reactor operation.

17. A reactor as claimed in claim 14, wherein the back-pressure mitigating system comprises at least one inlet of the at least two inlets being designed so that under operating conditions of the reactor a pressure drop will occur across the outlet of the at least one inlet.

18. A reactor according to claim 17, wherein the pressure drop is equal to or in excess of the maximum back-pressure that will be observed during operation of the reactor.

19. A reactor according to claim 14, the back-pressure mitigating system comprises an accumulator associated with at least one inlet of the at least two inlets to maintain constant delivery pressure of a component to be introduced through the at least one inlet.

20. A reactor according to claim 14, the back-pressure mitigating system comprises a needle valve to avoid fluctuations in back-pressure so that a constant flow of at least one of the components into the barrel may be achieved.

21. A reactor according to claim 14, wherein the back-pressure mitigating system comprises varying means for varying the flow rate of respective components to overcome back-pressure effects.

22. A reactor according to claim 21, wherein the varying means vary flow rate as a function of the back-pressure to maintain a constant flow rate of respective components into the barrel.

23. A reactor according to claim 22, wherein mass flow controllers are used to regulate the flow rates to target levels to achieve an effect of negating back-pressure effects.

24. A reactor according to claim 14, wherein the back-pressure mitigating system comprises a flow-through back-pressure regulator associated with a component delivery line to at least one inlet of the at least two inlets of the reactor to avoid fluctuations in back-pressure so that constant flow of the components may be achieved.

25. A reactor according to claim 14, wherein the at least one inlet feeds a component onto the lands of the screw over a full 360° rotation of the screw.

* * * * *